United States Patent
Nakamura et al.

(10) Patent No.: US 11,040,645 B2
(45) Date of Patent: Jun. 22, 2021

(54) SEAT BACK

(71) Applicants: TOYOTA BOSHOKU KABUSHIKI KAISHA, Aichi-ken (JP); TOYOTA JIDOSHA KABUSHIKI KAISHA, Aichi-ken (JP); INOAC CORPORATION, Aichi (JP)

(72) Inventors: Genzo Nakamura, Aichi-ken (JP); Hiroshi Maki, Aichi-ken (JP); Toshio Nakamura, Aichi-ken (JP); Katsuya Ueda, Aichi-ken (JP); Yasuhiro Yoshida, Aichi-ken (JP); Kentaro Kamiya, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP); INOAC CORPORATION, Aichi (JP)

( * ) Notice: Subject to any disclaimer, the term of this patent is extended or adjusted under 35 U.S.C. 154(b) by 0 days.

(21) Appl. No.: 16/851,523

(22) Filed: Apr. 17, 2020

(65) Prior Publication Data

US 2020/0339021 A1 Oct. 29, 2020

(30) Foreign Application Priority Data

Apr. 25, 2019 (JP) ............................. JP2019-084151

(51) Int. Cl.
*A47C 7/02* (2006.01)
*B60N 2/68* (2006.01)
(Continued)

(52) U.S. Cl.
CPC .............. *B60N 2/7011* (2013.01); *A47C 7/40* (2013.01); *B60N 2/646* (2013.01); *B60N 2/68* (2013.01)

(58) Field of Classification Search
CPC .......... B60N 2/68; B60N 2/682; B60N 2/686; B60N 2/64; B60N 2/7094; B60N 2/72; B60N 2/646; B60N 2/6009; B60N 2/5825; B60N 2/7011; B60N 2/4228; B60N 2/66; B60N 2/70; B60N 2/58; B60R 21/207
(Continued)

(56) References Cited

U.S. PATENT DOCUMENTS 9,694,723 B2   7/2017  Shimizu
9,738,194 B2 * 8/2017  Hoshi ....................... B60N 2/68
(Continued)

FOREIGN PATENT DOCUMENTS

JP    2018-114983    7/2018

*Primary Examiner* — Shin H Kim
(74) *Attorney, Agent, or Firm* — Greenblum & Bernstein, P.L.C.

(57) ABSTRACT

A seat back configured to support a back of a seated person includes a back frame that constitutes an internal framework; and an elastic mat that is fitted to the back frame so as to cover the back frame from a front side, the elastic mat having a planar shape and being configured to elastically support the back of the seated person. The back frame includes a frame body and a support wire that protrudes forward from the frame body. The elastic mat includes a plurality of hooks provided on a back surface of a main support portion configured to support the back of the seated person, the hooks being engaged with the support wire to fix the elastic mat to the support wire.

6 Claims, 4 Drawing Sheets

(51) Int. Cl.
*B60N 2/70* (2006.01)
*B60N 2/64* (2006.01)
*A47C 7/40* (2006.01)

(58) Field of Classification Search
USPC .................................................. 297/452.18
See application file for complete search history.

(56) References Cited

U.S. PATENT DOCUMENTS

| 9,963,057 | B2* | 5/2018 | Hoshi ...................... B60N 2/68 |
| 2010/0102607 | A1* | 4/2010 | Mizoi .................... B60N 2/667 |
| | | | 297/284.8 |
| 2011/0278886 | A1* | 11/2011 | Nitsuma .............. B60N 2/4228 |
| | | | 297/216.13 |
| 2012/0038199 | A1* | 2/2012 | Matsumoto .......... B60N 2/4228 |
| | | | 297/452.18 |
| 2014/0070594 | A1* | 3/2014 | Awata .................... B60N 2/686 |
| | | | 297/452.48 |
| 2015/0032037 | A1* | 1/2015 | Nakano .................. A61H 23/02 |
| | | | 601/46 |
| 2015/0203001 | A1* | 7/2015 | Akutsu .............. B60N 2/42745 |
| | | | 297/216.13 |
| 2015/0203013 | A1* | 7/2015 | Akutsu ................ B60N 2/5825 |
| | | | 297/452.18 |
| 2015/0343932 | A1* | 12/2015 | Hosoe ...................... B60N 2/72 |
| | | | 297/452.52 |
| 2015/0367762 | A1* | 12/2015 | Yasuda .................. B60N 2/686 |
| | | | 297/216.14 |
| 2016/0039323 | A1* | 2/2016 | Hoshi .................. B60N 2/7041 |
| | | | 297/452.18 |

\* cited by examiner

SEAT BACK

CROSS-REFERENCE TO RELATED APPLICATION

This application claims priority to Japanese Patent Application No. 2019-084151 filed on Apr. 25, 2019, incorporated herein by reference in its entirety.

BACKGROUND

1. Technical Field

The disclosure relates to a seat back. More specifically, the disclosure relates to a seat back configured to support a back of a seated person.

2. Description of Related Art

Japanese Patent Application Publication No. 2018-114983 (JP 2018-114983 A) discloses a seat back configured to include a back frame made of metal; a back pad made of a urethane foam for covering the back frame; and a back cover made of fabric for covering the back pad.

SUMMARY

In the above related art, the back frame needs to be covered with the back pad and the back cover, separately, and therefore, the configuration of the seat back is complicated, and thus assembly work is also complicated.

The disclosure provides a seat back that makes it possible to increase the ease of assembly work while maintaining seat performance.

An aspect of the disclosure relates to a seat back configured to support a back of a seated person. The seat back includes a back frame that constitutes an internal framework; and an elastic mat that is fitted to the back frame so as to cover the back frame from a front side, the elastic mat having a planar shape and being configured to elastically support the back of the seated person. The back frame includes a frame body and a support wire that protrudes forward from the frame body. The elastic mat includes a plurality of hooks provided on a back surface of a main support portion configured to support the back of the seated person, the hooks being engaged with the support wire to fix the elastic mat to the support wire.

With the simple assembly in which the elastic mat is fixed to the back frame by engaging the hooks with the support wire provided in the back frame, it is possible to obtain the seat back capable of providing good seating comfort offered by the elastic mat and good support strength offered by the back frame.

In the seat back according to the above aspect, the support wire may be bent in a U-shape, opposite end portions of the U-shape may serve as fixed portions that are fixed to the frame body; and a connecting portion that connects the opposite end portions of the U-shape may serve as an engagement portion that extends in an in-plane direction of the elastic mat, the engagement portion being engaged with the hooks.

With the above configuration, it is possible to appropriately increase the strength for supporting the elastic mat, the strength being provided by the support wire.

In the seat back according to the above aspect, the hooks may be engaged with the support wire from opposite sides alternately.

With the above configuration, the hooks are unlikely to be disengaged from the support wire. Thus, the elastic mat can stably support the back of the seated person such that better seating comfort is provided.

In the seat back according to the above aspect, the elastic mat may be made of a polyester-based thermoplastic elastomer, the elastic mat including a protruding portion that protrudes rearward so as to have a flange shape, and the protruding portion being provided in a peripheral edge portion of the elastic mat.

With the above configuration, the elastic mat has a lightweight structure that can easily provide good seating comfort and good air permeability. The elastic mat includes the protruding portion that protrudes rearward so as to have the flange shape, the protruding portion being provided in the peripheral edge portion of the elastic mat. Thus, although the elastic mat is made of the polyester-based thermoplastic elastomer and thus has a flexible structure, the peripheral edge portion of the elastic mat has the appropriate rigidity.

The seat back according to the above aspect may further include a backboard that covers the back frame from behind. In a peripheral portion of the seat back, a peripheral edge portion of the backboard and the peripheral edge portion of the elastic mat may be fitted to and combined with each other in a box shape so as to enclose the back frame.

With the above configuration, good external appearance of the seat back is provided by combining the elastic mat with the backboard in an integrated manner.

In the seat back according to the above aspect, a total width obtained by summing widths, in an up-down direction, of one or more lower hooks among the hooks may be greater than a total width obtained by summing widths, in the up-down direction, of one or more upper hooks among the hooks, the one or more lower hooks being provided in a lower region in the seat back, the lower region being configured to support a lower back of the seated person, and the one or more upper hooks being provided in an upper region above the lower region in the seat back.

With the above configuration, the elastic mat can receive the back of the seated person with the firmness that corresponds to the magnitude of the body pressure, and thus the elastic mat can provide the support such that the body pressure is appropriately dispersed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the drawings.

Firstly, a configuration of a seat back 1 according to a first embodiment of the disclosure will be described with reference to FIG. 1 to FIG. 4. In the following description, when forward, rearward, upward, downward, rightward, and leftward directions, and the like are indicated, the directions signify the respective directions indicated in each of the drawings. In addition, when a "seat width direction" is indicated, the direction signifies a right-left direction of the seat back 1.

Figure 1:
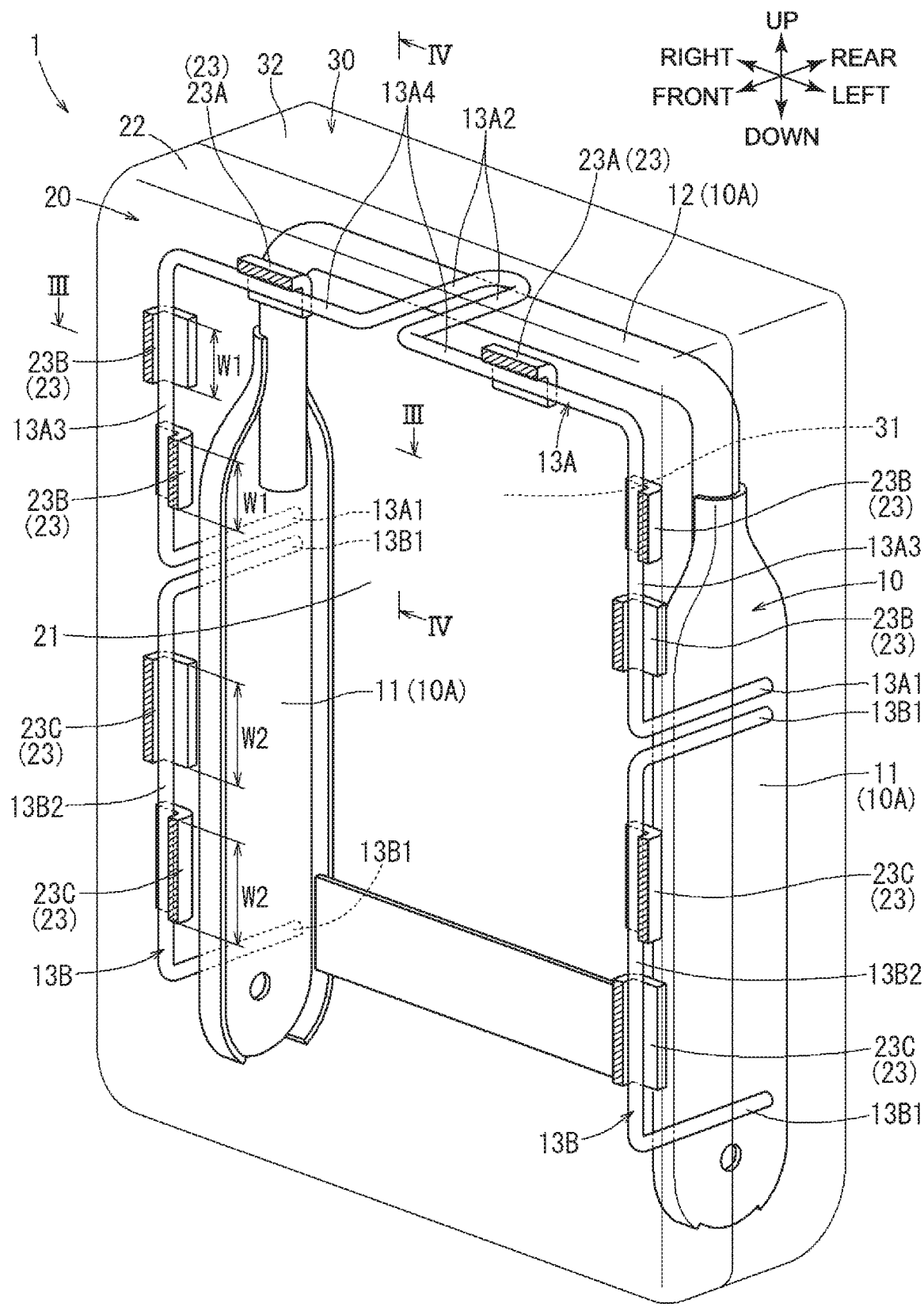
FIG. 1 is a perspective view of a schematic configuration of a seat back according to a first embodiment.

As illustrated in FIG. 1, the seat back 1 according to this embodiment is configured as a backrest of a seat for a vehicle (for example, an automobile). Lower end portions at right and left sides of the seat back 1 are respectively coupled to rear end portions at right and left sides of a seat cushion serving as a seated portion via recliners, which are not illustrated. In this way, a backrest angle of the seat back 1 with respect to the seat cushion can be adjusted via the recliners, which are not illustrated. A headrest, which is not illustrated and is used for resting a head, is attached to an upper portion of the seat back 1.

The seat back 1 includes a back frame 10 made of metal; an elastic mat 20 made of a polyester-based thermoplastic elastomer; and a backboard 30 made of a resin. The back frame 10 functions as a strengthening member that constitutes an internal framework of the seat back 1. The elastic mat 20 is fitted to the back frame 10 so as to cover the back frame 10 from the front side. The elastic mat 20 has a planar shape, and functions as a cushion member that elastically supports a back of a seated person. The backboard 30 is fitted to the back frame 10 so as to cover the back frame 10 from behind, and functions as a decorative board that improves the external appearance of a back surface of the seat back 1.

Next, a configuration of the back frame 10 will be described. More specifically, the back frame 10 includes: a side frame 11 that has a vertically-elongated plate shape, and that constitutes a lateral framework on each of the right and left sides of the seat back 1; and an upper pipe 12 that extends between upper portions of these side frames 11, constitutes an upper framework of the seat back 1, and is bent in a substantially inverted U-shape when seen from the front side. The back frame 10 further includes support wires 13A, 13B, each of which protrudes forward from a frame body 10A including the side frames 11 and the upper pipe 12.

Each of these support wires 13A, 13B is made of a steel wire, and is welded and joined to the frame body 10A. The support wire 13A is formed by bending the single steel wire to have the substantially inverted U-shape when seen from the front side. Lower end portions, which are opposite end portions of the inverted U-shape, in the support wire 13A are further bent rearward. Then, each of the lower end portions contacts, and is welded to an outer surface in an upper region of the side frame 11 on the corresponding side (a fixed portion 13A1).

In the support wire 13A, a center of an upper side portion that connects the end portions of the inverted U-shape is further bent so as to protrude rearward in the substantially inverted U-shape in a plan view. The center of the upper side portion contacts, and is welded to an upper surface of the upper pipe 12 (a fixed portion 13A2). In this way, the support wire 13A is brought into the following state. The fixed portion 13A1 at each end and the fixed portion 13A2 at the center of the support wire 13A are respectively joined to the side frame 11 and the upper pipe 12. Each engagement portion 13A3 extending in an up-down direction (an in-plane direction of the elastic mat 20) between the fixed portion 13A1 and the fixed portion 13A2 and serving as an intermediate portion and each engagement portion 13A4 extending in the right-left direction (the in-plane direction of the elastic mat 20) are securely supported by the frame body 10A.

A pair of the right and left support wires 13B is provided. Each of these support wires 13B is formed by bending the single steel wire to have the substantially U-shape that is opened rearward in a side view. Each of the support wires 13B has upper and lower end portions, which are opposite end portions of the U-shape, and the upper and lower end portions respectively contact, and are welded to the outer surfaces in the upper region and a lower region of the side frame 11 on the corresponding side (fixed portions 13B1). In this way, each of the support wires 13B is brought into the following state. The fixed portions 13B1 at the ends of each of the support wires 13B are joined to the upper and lower regions of the side frame 11 on the corresponding side, and an engagement portion 13B2 extending in the up-down direction (the in-plane direction of the elastic mat 20) between these fixed portions 13B1 and serving as an intermediate portion is securely supported by the frame body 10A.

Next, a configuration of the elastic mat 20 will be described. The elastic mat 20 is an injection-molded member that is made of the polyester-based thermoplastic elastomer. In this embodiment, as the polyester-based thermoplastic elastomer, "Hytrel (registered trademark)" produced by DU PONT-TORAY CO., LTD is used. The elastic mat 20 includes a main support portion 21 in a flat plate shape that is set to cover the back frame 10 from the front side; a protruding portion 22 that extends rearward from an entire peripheral edge of the main support portion 21 so as to have a flange shape; and hooks 23 that are provided on a back surface of the main support portion 21.

Figure 2:
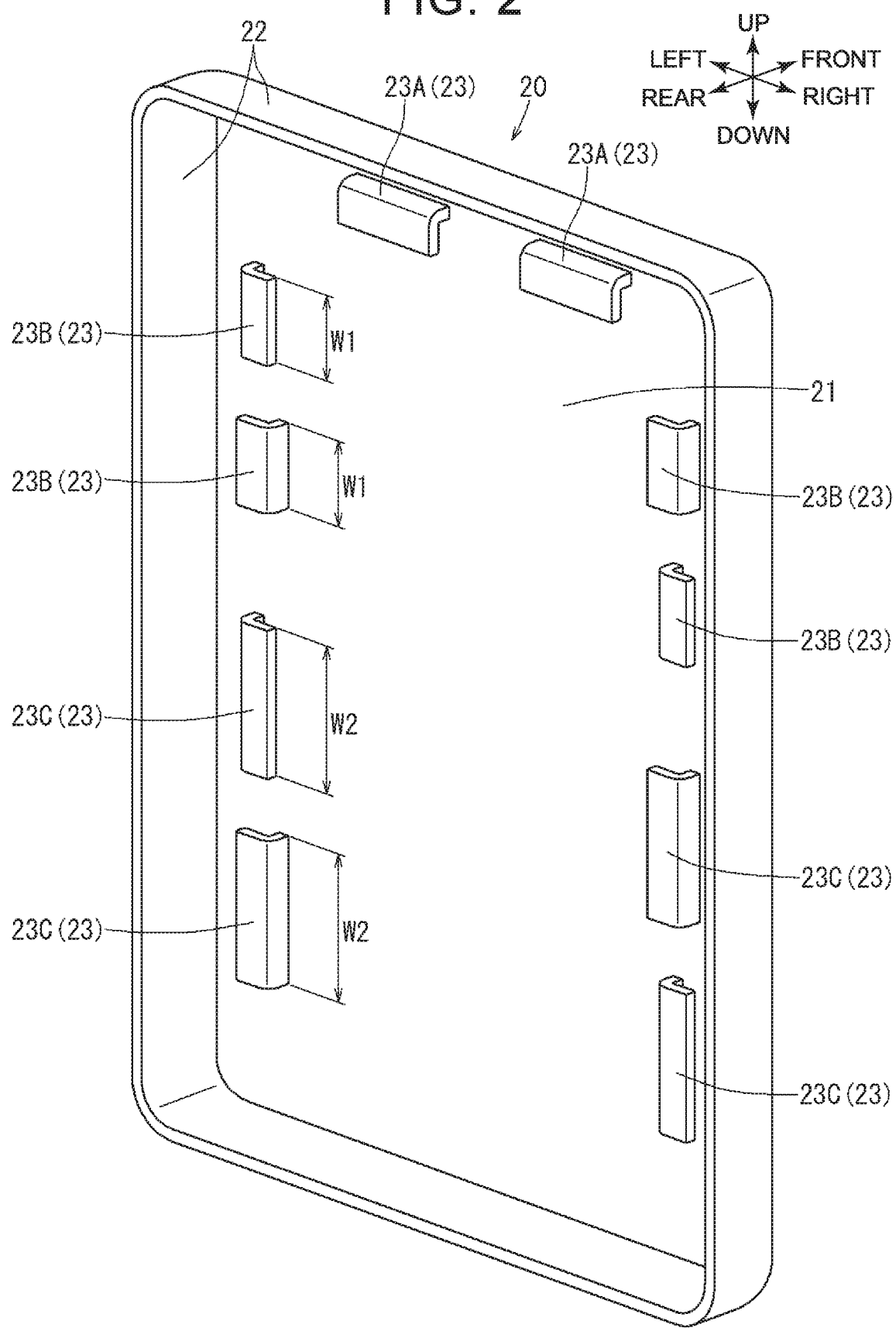
FIG. 2 is a perspective view of an elastic mat seen from a back surface side.

The main support portion 21 is in such size that the main support portion 21 is set to cover the side frames 11 and the upper pipe 12 of the back frame 10 from the front side. As illustrated in FIG. 2, the protruding portion 22 has a shape protruding rearward from the entire peripheral edge of the main support portion 21 so as to appropriately increase rigidity of the main support portion 21 against bending and twisting.

The hooks 23 include hooks 23A provided at two positions in an upper portion of the back surface of the main support portion 21; hooks 23B provided at four positions in an intermediate portion of the back surface of the main support portion 21; and hooks 23C provided at four positions in a lower portion of the back surface of the main support portion 21. Each of these hooks 23A, 23B, 23C is bent in an L-shape, and protrudes from the back surface of the main support portion 21. As illustrated in FIG. 1, these hooks 23A, 23B, 23C are respectively engaged with the engagement portions 13A4, 13A3, 13B2 of the support wires 13A, 13B provided in the back frame 10. In this way, the elastic mat 20 is fixed in a hooked state onto the back frame 10.

In detail, as illustrated in FIG. 2, a pair of the right and left hooks 23A is provided. A set of the right and left hooks 23B is provided. The two hooks 23B are aligned vertically on the right side, and the two hooks 23B are aligned vertically on the left side. A set of the right and left hooks 23C is provided. The two hooks 23C are aligned vertically and are also aligned with the two hooks 23B on the right side, and the two hooks 23C are aligned vertically and are also aligned with the two hooks 23B on the left side. As illustrated in FIG. 1, each of the hooks 23A is engaged with the engagement portion 13A4 from above. The engagement portion 13A4 extends in the right-left direction from the fixed portion 13A2 at the center of the support wire 13A (see FIG. 4).

Figure 3:
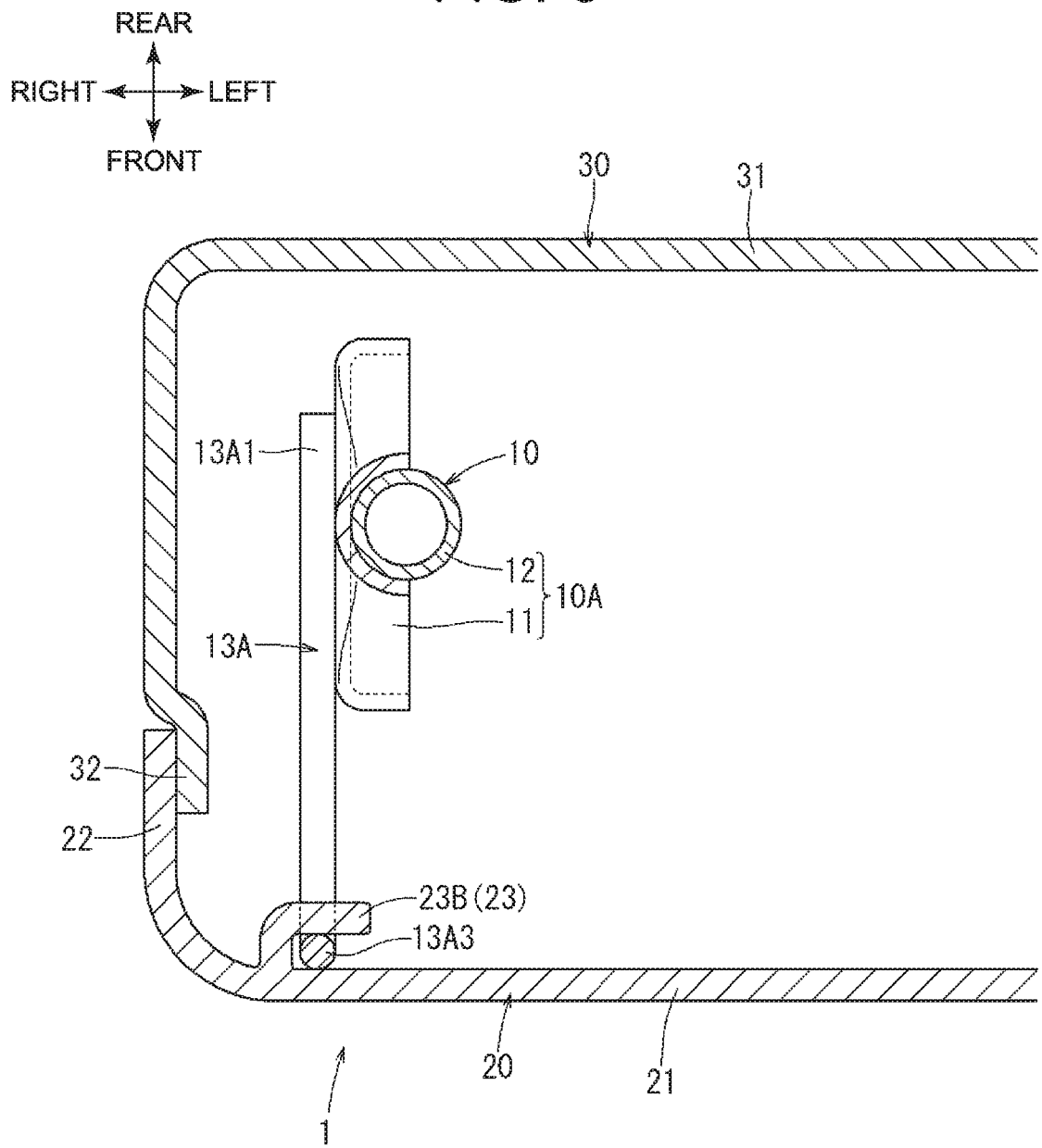
FIG. 3 is a sectional view taken along line III-III in FIG. 1.
Figure 4:
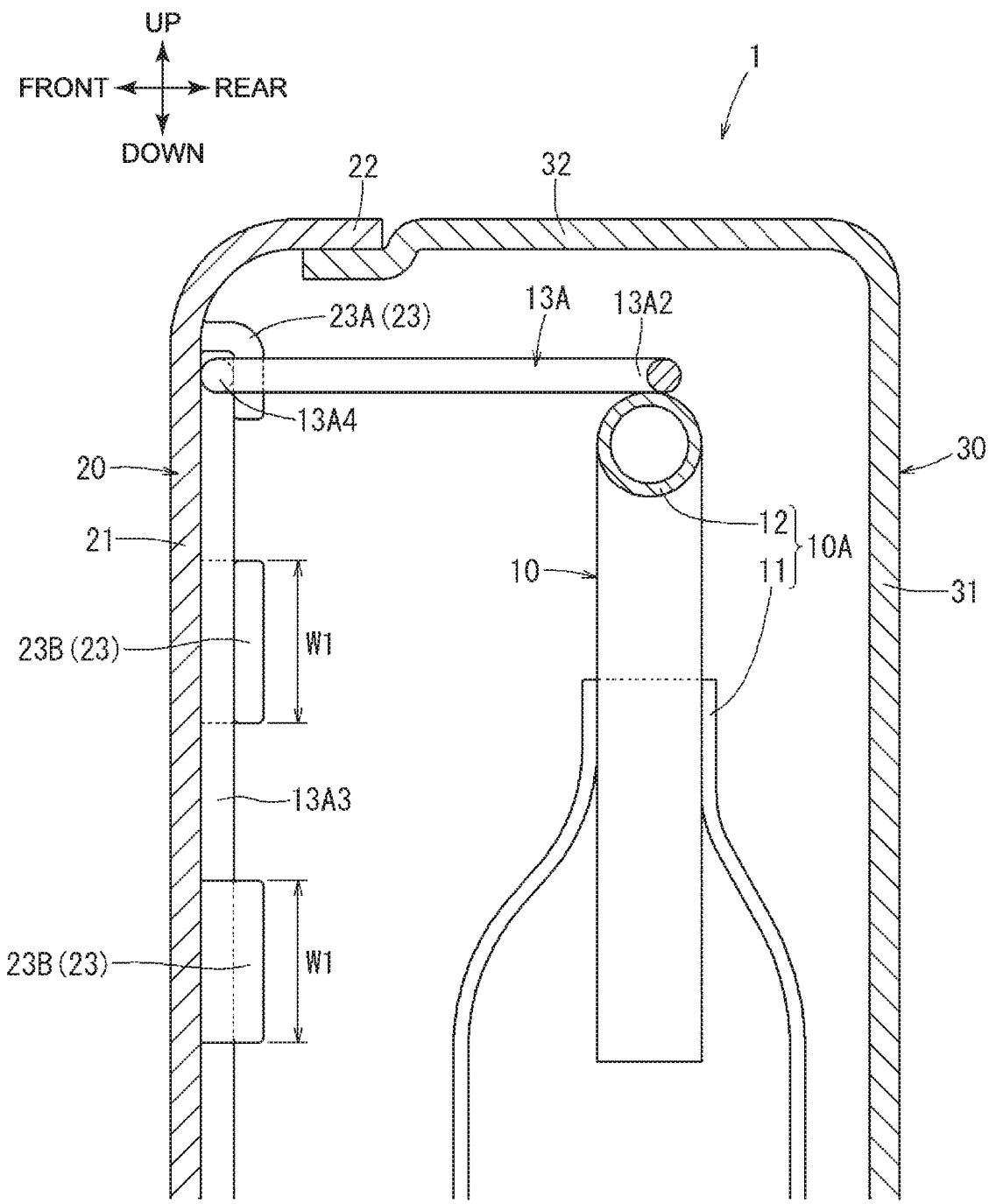
FIG. 4 is a sectional view taken along line IV-IV in FIG. 1.

In addition, as illustrated in FIG. 1, the hooks 23B are engaged with the engagement portion 13A3 from the inner side and the outer side in the seat width direction, alternately (see FIG. 3). The engagement portion 13A3 extends upward from the fixed portion 13A1 at each of the ends of the support wire 13A. More specifically, as illustrated in FIG. 1, the hooks 23B are configured such that, of the two hooks 23B aligned vertically, the hook 23B at the upper side is engaged with the engagement portion 13A3 from the inner side to the outer side in the seat width direction and the hook 23B at the lower side is engaged with the engagement portion 13A3 from the outer side to the inner side in the seat width direction. Here, each of the hooks 23B is an example of the "upper hook" in the disclosure.

As illustrated in FIG. 1, similarly, the hooks 23C are engaged with the engagement portion 13B2 from the inner side and the outer side in the seat width direction, alternately. The engagement portion 13B2 extends in the up-down direction between the fixed portions 13B1 at each of the ends of each support wire 13B. More specifically, the hooks 23C are configured such that, of the two hooks 23C aligned vertically, the hook 23C at the upper side is engaged with the engagement portion 13B2 from the inner side to the outer side in the seat width direction and the hook 23C at the lower side is engaged with the engagement portion 13B2 from the outer side to the inner side in the seat width direction. Here, each of the hooks 23C is an example of the "lower hook" in the disclosure.

When the hooks 23A, 23B, 23C are respectively engaged with the engagement portions 13A4, 13A3, 13B2 of the support wires 13A, 13B provided in the back frame 10, the elastic mat 20 is fitted to the back frame 10 while being positioned in the front-rear direction, the up-down direction, and the right-left direction. The engagement portions 13A4, 13A3, 13B2 in the support wires 13A, 13B provided in the back frame 10 are respectively engaged with the hooks 23A, 23B, 23C. The engagement portions 13A4, 13A3, 13B2 are disposed at the positions protruding forward from the back frame 10 so as to extend along the upper side, and the right and left sides of the back frame 10.

Accordingly, the hooks 23A, 23B, 23C are respectively engaged with the engagement portions 13A4, 13A3, 13B2 of the support wires 13A, 13B such that the elastic mat 20 is fixed. Thus, the upper, right, and left peripheral edge portions of the main support portion 21 of the elastic mat 20 are supported at positions protruding forward from the back frame 10. As a result, the elastic mat 20 is configured such that, when the seated person leans his/her back against a center portion of the main support portion 21, the center portion of the main support portion 21 is bent rearward relatively softly while right and left portions of the main support portion 21 are relatively firmly supported at positions protruding forward.

Therefore, the center portion of the elastic mat 20 can softly and elastically support the back of the seated person from behind while the right and left portions of the elastic mat 20 can support the back of the seated person from the right and left sides, respectively, with appropriate firmness (i.e., the right and left portions of the elastic mat 20 provide side support).

In detail, the pair of the right and left support wires 13B provided in a lower region of the seat back 1 is provided in the state where the engagement portions 13B2 of the right and left support wires 13B protrude forward significantly in comparison with the engagement portions 13A3 of the support wire 13A provided in an upper region of the seat back 1. The hooks 23C are engaged with the engagement portions 13B2 of the right and left support wires 13B provided in the lower region. Each of the hooks 23C is configured to have a greater width W2 in the up-down direction than a width W1 in the up-down direction of each of the hooks 23B. The hooks 23B are engaged with the engagement portions 13A3 extending in the up-down direction of the support wire 13A provided in the upper region.

Thus, the total width obtained by summing the widths W2 in the up-down direction of the hooks 23C is greater than the total width obtained by summing the widths W1 in the up-down direction of the hooks 23B. Accordingly, the elastic mat 20 is configured such that a lower region of the elastic mat 20 for supporting a lower back of the seated person is securely supported by the hooks 23C and the support wires 13B from the right and left sides. As a result, the elastic mat 20 is configured to be able to receive the back of the seated person with the firmness that corresponds to a magnitude of a body pressure and thus can provide the support such that the body pressure is appropriately dispersed.

The backboard 30 includes a back plate portion 31 in a flat plate shape that is set to cover the back frame 10 from behind; and a protruding portion 32 that extends forward from an entire peripheral edge of the back plate portion 31 so as to have a flange shape. The back plate portion 31 is in such size that the back plate portion 31 is set to cover the side frames 11 and the upper pipe 12 of the back frame 10 from behind. The protruding portion 32 has a shape protruding forward from the entire peripheral edge of the back plate portion 31 so as to increase rigidity of the back plate portion 31 against bending and twisting.

The backboard 30 is set to cover the back frame 10 from behind, and is integrally fixed to the back frame 10 when several portions in the backboard 30 are engaged with the back frame 10 from behind or are fitted to the back frame 10 by snap-fit joints. After the backboard 30 is fitted to the back frame 10, the elastic mat 20 is fitted to the back frame 10 from the front side. At the time, the backboard 30 and the elastic mat 20 are fitted to each other such that the protruding portion 22 at the peripheral edge of the elastic mat 20 is fitted to the protruding portion 32 at the peripheral edge of the backboard 30 from the outer peripheral side (see FIG. 3 to FIG. 4).

Thus, the backboard 30, which has been fitted to the back frame 10, is fitted to the elastic mat 20 to form a box shape such that the back frame 10 is enclosed between the backboard 30 and the elastic mat 20. Therefore, the back frame 10 is covered with the elastic mat 20 and the backboard 30 that are combined with each other to form the box shape, such that the back frame 10 is hidden from the outside and thus good external appearance is provided.

The elastic mat 20 is made of the polyester-based thermoplastic elastomer ("Hytrel (registered trademark)" produced by DU PONT-TORAY CO., LTD.). Thus, the firmness of the elastic mat 20 can be easily adjusted and air permeability of the elastic mat 20 can be easily improved by providing a slit or a hole, which is not illustrated, in the main support portion 21. In addition, the elastic mat 20 with the rich external appearance can be easily provided by embossing the surface of the elastic mat 20, providing the surface of the elastic mat 20 with a geometric pattern, or providing the surface of the elastic mat 20 in two colors.

The seat back 1 according to this embodiment has the following configuration. The seat back (1) configured to support the back of the seated person includes the back frame (10) that constitutes the internal framework; and the elastic mat (20) that is fitted to the back frame (10) so as to cover the back frame (10) from the front side. The elastic mat (20) has a planar shape and is configured to elastically support the back of the seated person.

The back frame (10) includes the support wires (13A, 13B) that protrude forward from the frame body (10A). The elastic mat (20) includes the hooks (23A, 23B, 23C) that are provided on the back surface of the main support portion (21) configured to support the back of the seated person. The hooks (23A, 23B, 23C) are engaged with the support wires (13A, 13B) to fix the elastic mat (20) to the support wires (13A, 13B).

Thus, with the simple assembly in which the elastic mat (20) is fixed to the back frame (10) by engaging the hooks (23A, 23B, 23C) with the support wires (13A, 13B) provided in the back frame (10), it is possible to obtain the seat back (1) capable of providing good seating comfort offered by the elastic mat (20) and good support strength offered by the back frame (10).

Each of the support wires (13A, 13B) is bent in the U-shape, the opposite end portions of the U-shape serve as the fixed portions (13A1, 13A2, 13B1) that are fixed to the frame body (10A), and the connecting portion that connects the opposite end portions of the U-shape serves as the engagement portion (13A4, 13A3, 13B2) that extends in the in-plane direction of the elastic mat (20) and is engaged with the hooks (23A, 23B, 23C). With the above configuration, it is possible to appropriately increase the strength for supporting the elastic mat (20), the strength being provided by the support wires (13A, 13B).

The hooks (23B, 23C) are engaged with the support wires (13A, 13B) from opposite sides alternately. With the above configuration, the hooks (23B, 23C) are unlikely to be disengaged from the support wires (13A, 13B). Thus, the elastic mat (20) can stably support the back of the seated person such that better seating comfort is provided.

The elastic mat (20) is made of the polyester-based thermoplastic elastomer, the elastic mat (20) including the protruding portion (22) that protrudes rearward so as to have the flange shape, and the protruding portion (22) being provided in the peripheral edge portion of the elastic mat (20). With the above configuration, the elastic mat (20) has a lightweight structure that can easily provide good seating comfort and good air permeability. The elastic mat (20) includes the protruding portion (22) that protrudes rearward so as to have the flange shape, the protruding portion (22) being provided in the peripheral edge portion of the elastic mat (20). Thus, although the elastic mat (20) is made of the polyester-based thermoplastic elastomer and thus has a flexible structure, the peripheral edge portion of the elastic mat (20) has the appropriate rigidity.

The seat back (1) further includes the backboard (30) that covers the back frame (10) from behind. In a peripheral portion of the seat back (1), the peripheral edge portion of the backboard (30) and the peripheral edge portion of the elastic mat (20) are fitted to and combined with each other in the box shape so as to enclose the back frame (10). With the above configuration, good external appearance of the seat back (1) is provided by combining the elastic mat (20) with the backboard (30) in an integrated manner.

The total width obtained by summing the widths of the one or more lower hooks (23C) among the hooks (23A, 23B, 23C) is greater than the total width obtained by summing the widths of the one or more upper hooks (23B) among the hooks (23A, 23B, 23C). The one or more lower hooks (23C) are provided in the lower region in the seat back (1), the lower region being configured to support the lower back of the seated person. The one or more upper hooks (23B) are provided in the upper region above the lower region in the seat back (1). With the above configuration, the elastic mat (20) can receive the back of the seated person with the firmness that corresponds to the magnitude of the body pressure, and thus the elastic mat (20) can provide the support such that the body pressure is appropriately dispersed.

The embodiment of the disclosure has been described so far. However, the disclosure can be also implemented in any of various embodiments in addition to the above embodiment.

The seat back in the disclosure can be widely applied to seats used in various kinds of vehicles including vehicles other than automobiles, such as trains, airplanes, vessels, and the like. In addition to the vehicle seats, the seat back can be further widely applied to various kinds of seats including audience seats installed at sport facilities, theaters, concert venues, event sites, and the like, massage chairs, and the like.

The elastic mat may be made of the polyester-based thermoplastic elastomer other than "Hytrel (registered trademark)" produced by DU PONT-TORAY CO., LTD. Alternatively, the elastic mat may be made of rubber or another resin material.

The hooks may be members that are integrally provided in the elastic mat by integral molding. The support wires engaged with the hooks may protrude from the frame body of the back frame in a cantilevered manner. Instead of engaging the hooks with the support wires from opposite sides alternately, the hooks may be engaged with the support wires from the same side. The number of the upper hooks is one or more, and the number of the lower hooks is one or more.

The elastic mat may not include the protruding portion provided in the peripheral edge portion to protrude rearward. The protruding portion does not necessarily need to be provided in the entire peripheral edge portion of the elastic mat and may be provided in a part of the peripheral edge portion of the elastic mat. Similarly, the backboard may not include the protruding portion provided in the peripheral edge portion to protrude forward.

In the case where the backboard does not include the protruding portion that protrudes forward, the protruding portion of the elastic mat may be fitted to and combined with the peripheral edge portion of the backboard so as to form the box shape. In the case where the elastic mat does not include the protruding portion that protrudes rearward, the protruding portion of the backboard may be fitted to and combined with the peripheral edge portion of the elastic mat so as to form the box shape. A clearance may be provided between the elastic mat and the backboard. The peripheral edge portion of the elastic mat may be covered with a side shield that is made of a resin and provided to cover the peripheral portion of the seat back.

What is claimed is:

1. A seat back configured to support a back of a seated person, the seat back comprising:
    a back frame that constitutes an internal framework; and
    an elastic mat that is fitted to the back frame so as to cover the back frame from a front side, the elastic mat having a planar shape and being configured to elastically support the back of the seated person, wherein
    the back frame includes a frame body and a support wire that protrudes forward from the frame body, and the elastic mat includes a plurality of hooks provided on a back surface of a main support portion configured to support the back of the seated person, the hooks being engaged with the support wire to fix the elastic mat to the support wire.

2. The seat back according to claim 1, wherein:

the support wire is bent in a U-shape;

opposite end portions of the U-shape serve as fixed portions that are fixed to the frame body; and a connecting portion that connects the opposite end portions of the U-shape serves as an engagement portion that extends in an in-plane direction of the elastic mat, the engagement portion being engaged with the hooks.

3. The seat back according to claim 1, wherein the hooks are engaged with the support wire from opposite sides alternately.

4. The seat back according to claim 1, wherein the elastic mat is made of a polyester-based thermoplastic elastomer, the elastic mat including a protruding portion that protrudes rearward so as to have a flange shape, and the protruding portion being provided in a peripheral edge portion of the elastic mat.

5. The seat back according to claim 1 further comprising a backboard that covers the back frame from behind, wherein in a peripheral portion of the seat back, a peripheral edge portion of the backboard and the peripheral edge portion of the elastic mat are fitted to and combined with each other in a box shape so as to enclose the back frame.

6. The seat back according to claim 1, wherein a total width obtained by summing widths, in an up-down direction, of one or more lower hooks among the hooks is greater than a total width obtained by summing widths, in the up-down direction, of one or more upper hooks among the hooks, the one or more lower hooks being provided in a lower region in the seat back, the lower region being configured to support a lower back of the seated person, and the one or more upper hooks being provided in an upper region above the lower region in the seat back.

* * * * *